J. FORD.
Grain-Drill.
No. 23,561.                                                                        Patented Apr. 12, 1859.
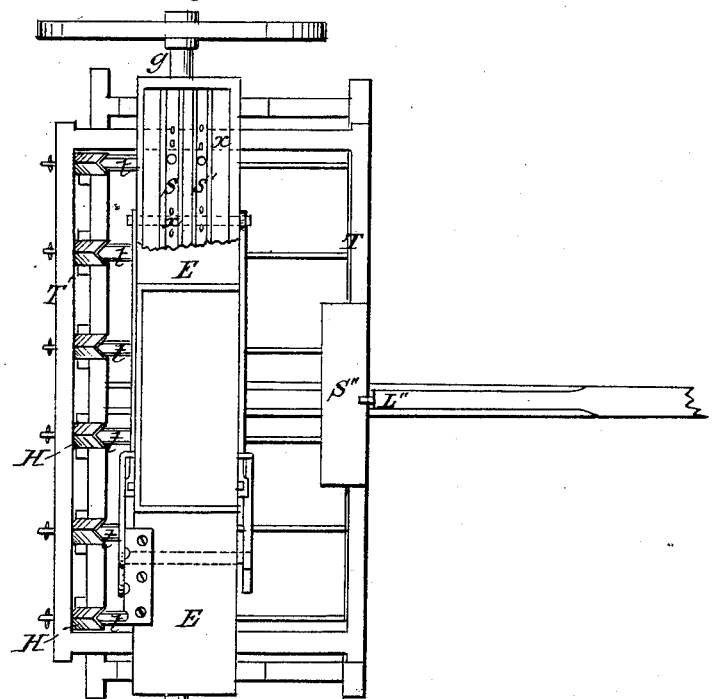
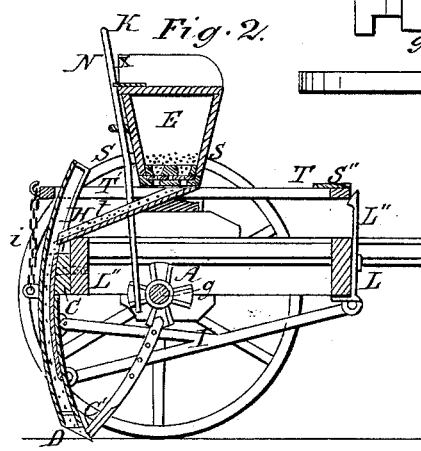
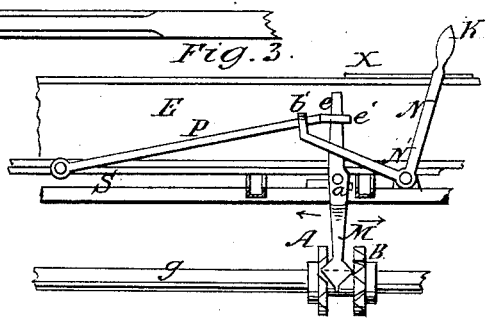

UNITED STATES PATENT OFFICE.

JAS. FORD, OF WABASH, INDIANA.

IMPROVEMENT IN GRAIN-DRILLS.

Specification forming part of Letters Patent No. 23,561, dated April 12, 1859.

*To all whom it may concern:*

Be it known that I, JAMES FORD, of Wabash, Wabash county, State of Indiana, have invented new and useful Improvements on the Grain-Drill; and I do hereby declare that the following is a full, clear, and exact description of the construction and operation of the same, reference being had to the annexed drawings, making a part of this specification, in which—

Figure 1 is a plan view; Fig. 2, a sectional elevation, and Fig. 3 is an elevation of detached parts.

This drill is mounted on two wheels connected by a main shaft, $g$, in the usual manner. Extending between the wheels there is a longitudinal box, E, for the reception of the seed. The lower part of the box E is provided with two seed-slides, S S', which work longitudinally in grooves in the box E. The slides are perforated at suitable intervals, $x$, to permit the escape of the seed into troughs $t$. The latter are attached at one end to the lower part of the box E, under which they pass sufficiently far to receive the seed which drops from the apertures $x$. The seed, after entering the troughs $t$, falls by its own gravity through them into the tubes H, (which are of the ordinary construction,) and thence into the ground.

The motion of the seed-slides S S' and the consequent feeding of the seed are accomplished by means of beveled spoked wheels A B, which are secured in pairs at suitable distances upon the main shaft $g$. The wheels A B are provided with bevel-edged spokes, and between them the extremities of two vibrating levers, M, are fitted. These levers are pivoted at $a'$ to a projection on the side of the box E. The ends of the levers M, which fit between wheels A B, are of diamond-shaped, so that when said wheels revolve their spokes will alternately strike the sides of the diamond parts and cause the levers M to vibrate upon their fulcrums $a'$. The opposite ends $e$ of levers M pass through loops $e'$ upon the extremities of longitudinal rods P, whose lower ends are attached to the slides S S', and thus, by the vibration of levers M in direction of the arrows, the slides S S' will be correspondently vibrated and the seed dropped. The extent of the vibration of the slides S S' is regulated by raising or lowering the position of the loops $e'$ of the rods P upon the levers M. When the loops $e'$ are raised to the highest point the slides will have the greatest movement, and when loops $e'$ are lowered the slides will vibrate less. The raising or lowering of loops $e'$ is accomplished by means of a double-armed bell-crank lever, N, secured or pivoted at N' to the lower part of box E. The ends of the lever N terminate in loops $b'$, which encircle the rods P. The lever N has also attached to it a handle or lever, K, by which it is moved. By moving the handle K in one direction the loops $b'$ will be thrown up and caused to lift the rods P, and vice versa. The extent of vibration of the slides may be changed at any moment, even during the movement of the machine, by simply changing the relative position of the handle K. The said handle is secured in any desired position by being so arranged as to fit into the notches of a plate, X, which is secured to the upper part of box E.

The tubes H are attached to the frame of the machine L L'' by means of forked rods I, which extend from the lower part of the tubes to a hinge, J, the latter being bolted to L. The upper ends of tubes H are slotted, and are steadied by screw-pins $c'$, which pass from the interior of the slotted portion of the tubes H through plates $u$ into frame L''. Pins $c'$ thus steady the upper end of tubes H, at the same time permitting them to rise and fall. The depth to which the tubes H enter the ground is regulated by the adjusting of the chains $i$, which extend from the projections on the rear part of the tubes H to a tilting frame, T T', the cross-bars of which are pivoted to and tilt upon the central part of the frame L under the seed-box. The side T of the tilting frame comes immediately below the feet of the driver, where it is provided with a foot-plate, S''. By pressing down the side T the rear side T' (to which the adjusting chains $i$ are fastened) will be raised, and the tubes H will be lifted from the ground.

$L^4$ is a vertical spring-catch, extending up from the frame L. Said catch is so arranged that when the plate S'' is pressed far enough down the catch will spring over the edge of the plate S'' and hold down that side of T, thus elevating the opposite side, T', and raising the tubes H from the ground. When it is desired to allow the tubes to descend the driver simply pushes the catch $L^4$ off from the plate S″, when the frame falls by its own gravity. The lower ends of the tubes are provided with furrow-openers or shovels, D′, which are pivoted to the tubes and have adjustable cutter-rods C connected with their front parts. The lower part of these cutter-rods serves to cut the soil and assist in opening the furrow, while by means of their upper ends they are themselves adjusted, and they also adjust the depth of the shovels D′. The upper parts of rods C are provided with holes, and corresponding holes are made in the arms of rods I. By means of pins passing through the respective holes the rods C are adjusted at pleasure.

Having thus described my invention, I claim and desire to secure by Letters Patent—

The arrangement and combination of the seed-box E, lever N, rod P, slide S, lever M, and tilting frame T T′, as and for the purpose herein shown and described.

JAMES FORD.

Attest:
G. S. FULTON,
WILL. K. THURSTON.